United States Patent [19]
Kaminski

[11] Patent Number: 5,167,316
[45] Date of Patent: Dec. 1, 1992

[54] POSITIONING AND INDEXING MOLDED HOLLOW PLASTIC ARTICLES

[75] Inventor: Ronald S. Kaminski, Bowling Green, Ohio

[73] Assignee: Owens-Illinois Plastic Products, Inc., Toledo, Ohio

[21] Appl. No.: 757,391

[22] Filed: Sep. 10, 1991

[51] Int. Cl.$^5$ .............................................. B65G 47/02
[52] U.S. Cl. .............................. 198/463.4; 198/468.4; 198/345.2
[58] Field of Search .................. 198/345.1, 345.2, 461, 198/463.4, 468.4, 471.1, 689.1, 803.5

[56] References Cited

U.S. PATENT DOCUMENTS

| | | | |
|---|---|---|---|
| 3,775,862 | 12/1973 | Emge | 198/471.1 |
| 4,561,534 | 12/1985 | Nalbach | 198/689.1 |
| 4,736,831 | 4/1988 | Fields | 198/689.1 |

FOREIGN PATENT DOCUMENTS

2184085  6/1987  United Kingdom ............. 198/345.2

Primary Examiner—Joseph E. Valenza

[57] ABSTRACT

A method and apparatus for positioning and indexing molded hollow plastic articles for trimming molded hollow plastic articles having flash and a finish for a closure wherein the articles are supported and moved in succession by a vacuum conveyor which holds the articles in upright position and moves them past successive stations for deflashing, facing, inspection, rejection and unloading. The conveyor is a chain slat conveyor having longitudinally spaced vertical holes that communicate with a vacuum chamber over which the conveyor is trained. The conveyor is driven intermittently and moves the articles in succession past each of the stations. At the load station, the articles are oriented so that they are in proper alignment and relationship to the openings in the conveyor.

5 Claims, 7 Drawing Sheets

POSITIONING AND INDEXING MOLDED HOLLOW PLASTIC ARTICLES

This invention relates to the trimming of molded plastic articles and more particularly to the trimming of the flash and finish of hollow blow molded plastic articles.

BACKGROUND AND SUMMARY OF THE INVENTION

When formed in dies, hollow blow molded plastic articles such as containers or bottles usually have flash in at least one of the shoulder, neck and finish areas. The finish also has material which must be removed to provide an end face for sealing engagement with a closure or cap engageable with the neck of the article.

Various methods and apparatus have been previously used to remove the flash from an article and machine a face on the finish. In these methods, a separate apparatus or machine has been used to perform each step of removing the flash, removing material from the finish, forming a face on the finish, and inspecting the completed article. Conveyors move the articles from one machine to the next and separate transfer mechanisms associated with each machine pickup and load articles into each machine and unload articles from each machine.

In U.S. Pat. No. 4,614,018 there is disclosed a method and apparatus wherein hollow plastic articles to be trimmed are intermittently advanced through a plurality of generally circumferentially spaced stations by a turret carrying vacuum heads engaging the articles. To assure positive and accurate location of the articles in each station each vacuum head picks up and engages an article in a load station and continuously engages the same article throughout all successive stations unless the article is rejected and released prior to the unload station. Preferably, to facilitate processing runs of articles of different sizes, the articles are located and engaged relative to a bottom edge thereof. Preferably, to facilitate loading, unloading and processing of articles in the stations, each vacuum head can be moved to change the orientation of the axis of the article it is carrying from one station to another. When at least two articles could be processed at the same time in a station, the articles are laterally spaced apart when carried by each vacuum head assembly to facilitate processing them in the station. To facilitate changing the cycle time of the trimming apparatus, the turret and the loading and processing equipment in the various stations are all driven by a common variable speed drive. To facilitate processing runs of articles of different sizes, the location of the processing equipment in each station can be varied and adjusted with respect to the position of articles in the station engaged by the vacuum heads.

It has been known that when a simple conveyor is used, significant effort is needed to insure that the bottles are accurately located in each station prior to beginning the operation. The process of locating the bottle causes time loss and uses significant floor space. In addition, the conveyor speed must be relatively slow to prevent tipping of the bottles. The slow speed of the conveyor further limits the speed of the trimming system.

When a more complex apparatus with bottle holding nests is used, the location and speed problems are reduced and less floor spaced is needed. However, this type of conveyor is required a large number of bottle holding nests which require more investment and time for each job change. Such a method and apparatus are shown, for example, in U.S. Pat. No. 4,198,886.

Most bottles are designed to stand on a stable flat base. Because of this it is possible to handle most bottles on a simple conveyor without special tooling. However, empty plastic bottles with flash at the top are difficult to convey standing up because they are very unstable.

Among the objectives of the present invention, are to provide a method and apparatus for positioning and indexing molded hollow plastic articles such as empty plastic bottles which need to be trimmed at the top and moving the articles through successive stations while the articles are in upright position; wherein the articles are held in stable upright position; and wherein complex conveyors including bottle holding nests, vacuum cups and the like are eliminated.

In accordance with the invention, a method and apparatus for positioning and indexing molded hollow plastic articles for trimming molded hollow plastic articles having flash and a finish for a closure; wherein the articles are supported and moved in succession by vacuum conveyor which holds the articles in upright position and moves them past successive stations for deflashing, facing, inspection, rejection and unloading. The conveyor is a chain slat conveyor having longitudinally spaced vertical holes that communicate with a vacuum chamber over which the conveyor is trained. The conveyor is driven intermittently and moves the articles in succession past each of the stations. At the load station, the articles are oriented so that they are in proper alignment and relationship to the openings in the conveyor.

DESCRIPTION

In accordance with the invention, the method and apparatus for trimming molded hollow plastic articles, such as plastic bottles having flash and a finish for a closure, comprises supporting the articles A and moving them in succession by vacuum conveyor 10 which holds the articles in upward position and moves them passed station for deflashing, facing, inspection, rejection and unloading. The conveyor is a chain slat conveyor having longitudinally spaced vertical holes that communicate with a vacuum chamber over which the conveyor is trained. The conveyor is driven intermittently and moves the articles in succession passed each of the stations. At a load station, the articles are oriented by a loading apparatus so that they are in proper alignment and relationship to the openings in the conveyor.

Figure 1:
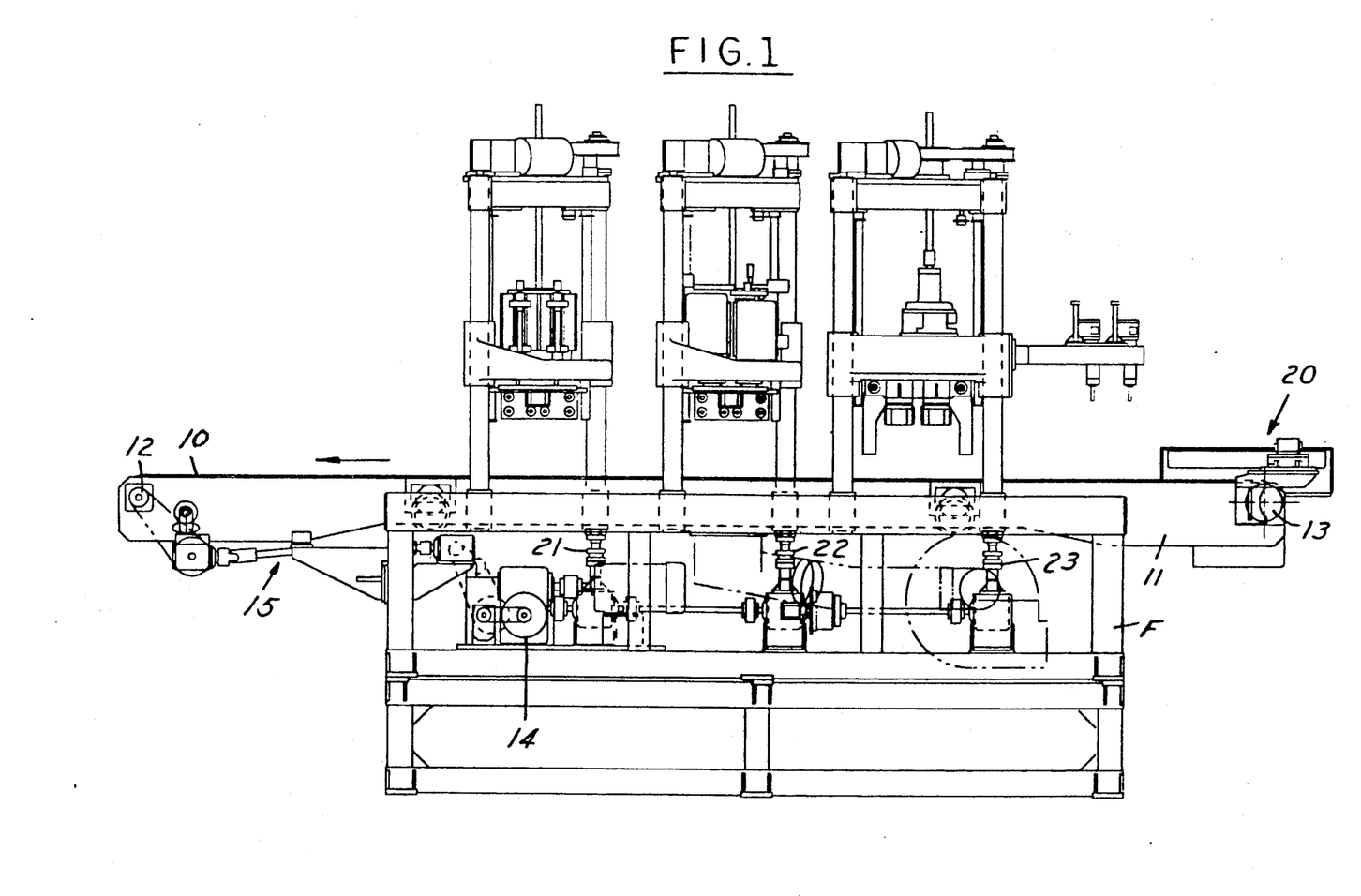
FIG. 1 is a side elevational view of an apparatus embodying the invention.
Figure 2:
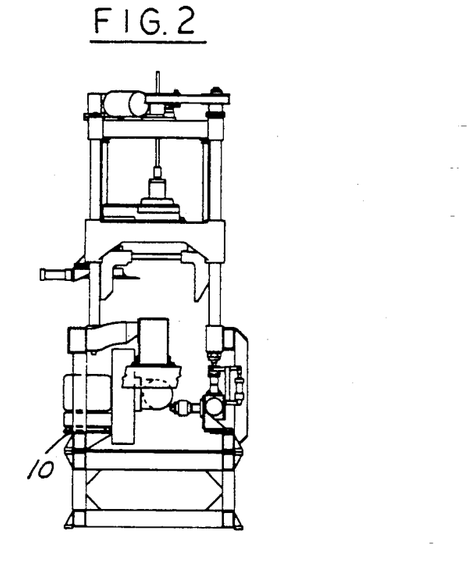
FIG. 2 is an end view taken from the right in FIG. 1.
Figure 3:
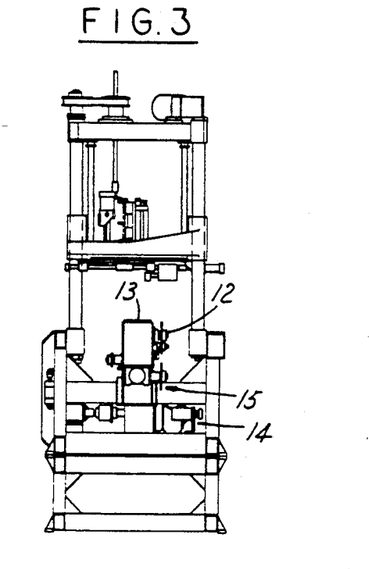
FIG. 3 is an end view taken from the left in FIG. 1.
Figure 4:
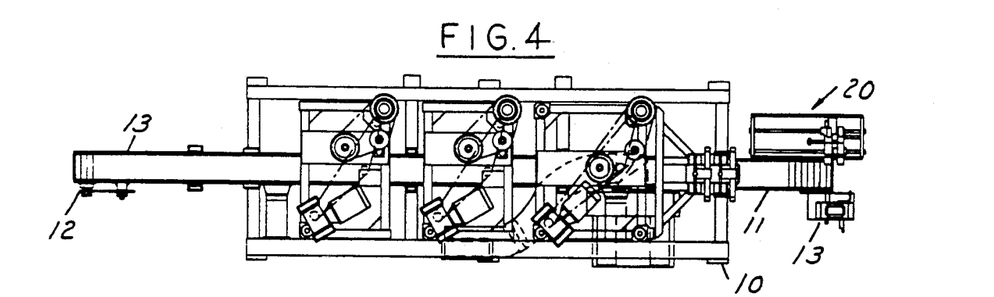
FIG. 4 is a plan view of the apparatus.

Referring to FIG. 1, the apparatus comprises a frame F that supports a conveyor frame 11 comprising a power driven roller 12 at one end and an idler roller 13 at the other over which a vacuum conveyor in the form of a link slat conveyor 10 is trained and driven intermittently in the direction of the arrow as shown in FIG. 1. The drive for the conveyor is from a motor 14 and linkage 15.

Figure 6:
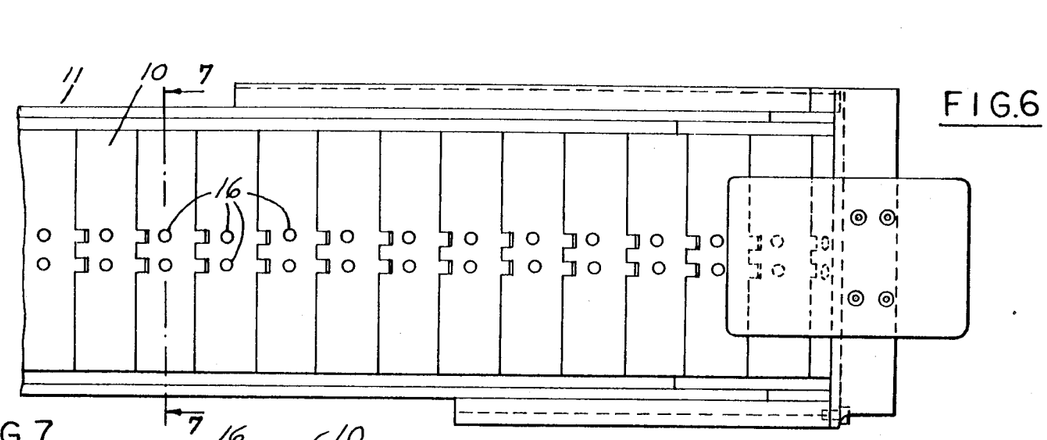
FIG. 6 is a fragmentary plan view of a conveyor portion of the apparatus.
Figure 7:
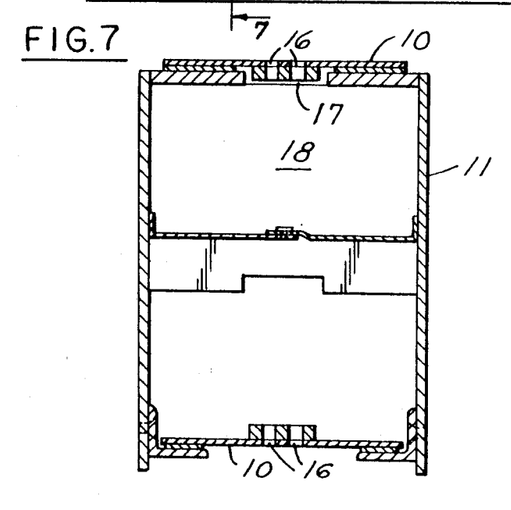
FIG. 7 is a sectional view taken along the line 7—7 in FIG. 7.

As shown in FIGS. 6 and 7, the conveyor 10 has longitudinally spaced openings 16 therein which communicate through an opening 17 of a vacuum chamber 18 to apply vacuum that draws the base of the articles and holds the article onto the conveyor 10.

The articles comprise hollow blow molded plastic articles which are formed with flash and a neck that requires trimming for receiving a closure. Such articles are light in weight and unstable when empty.

The conveyor moves article received from a loader 20 at a first station preferably to successive stations as follows:

Station 1—Loading
Station 2—Orientor
Station 3—Position check
Station 4—Deflashing
Station 5—Idle
Station 6—Facer
Station 7—Idle
Station 8—Leak check and label inspection
Station 9—Rejection
Station 10—Idle
Station 11—Off-load At each of the deflash, facer and leak check and label inspection stations, apparatus well known in the art is provided to perform these functions. Such apparatus is driven in time relationship with the motion of the conveyor 10 from the motor 14 through linkage 21, 22 and 23.

Figure 5:
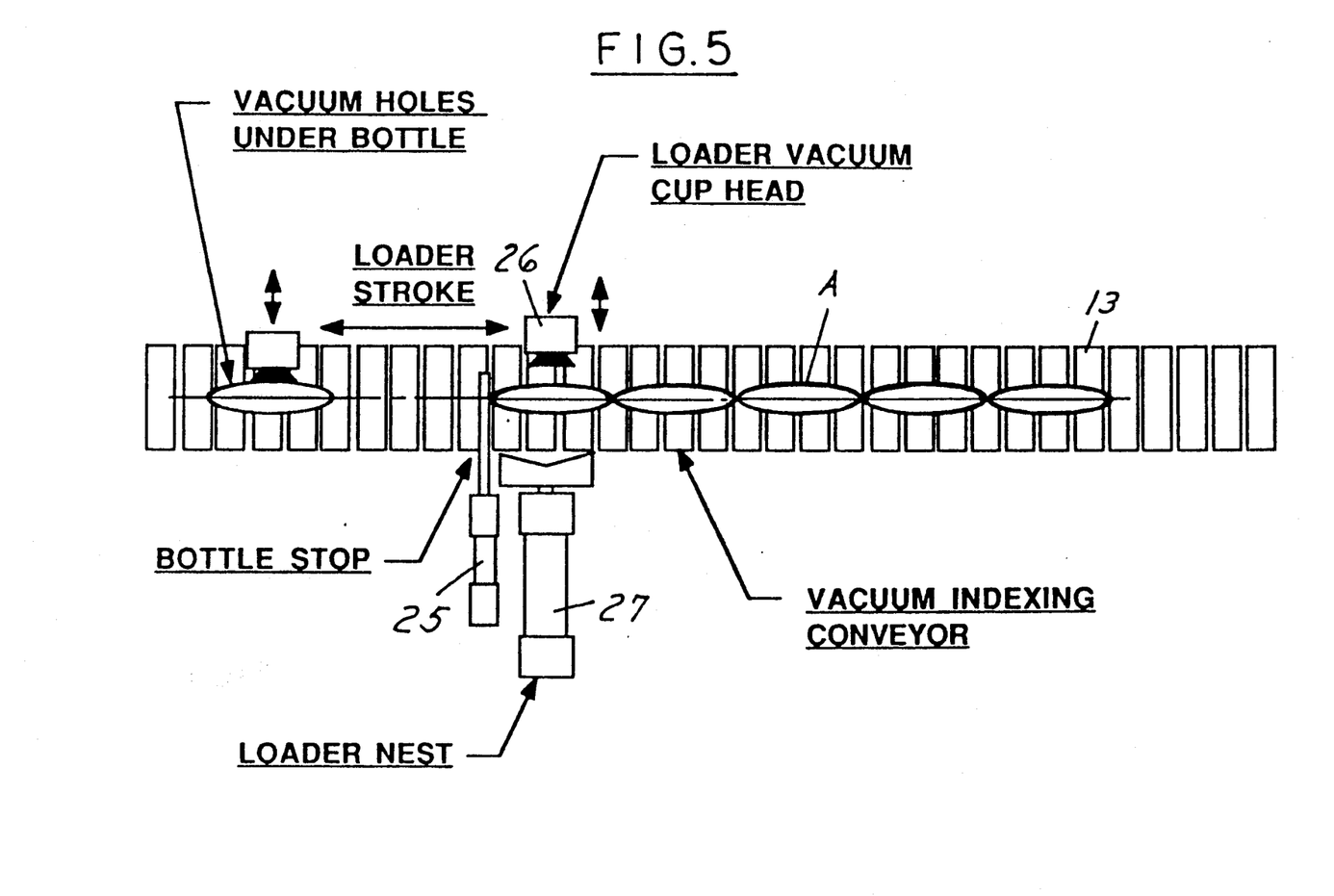
FIG. 5 is a fragmentary schematic plan view of the loading portion of the apparatus.
Figure 8:
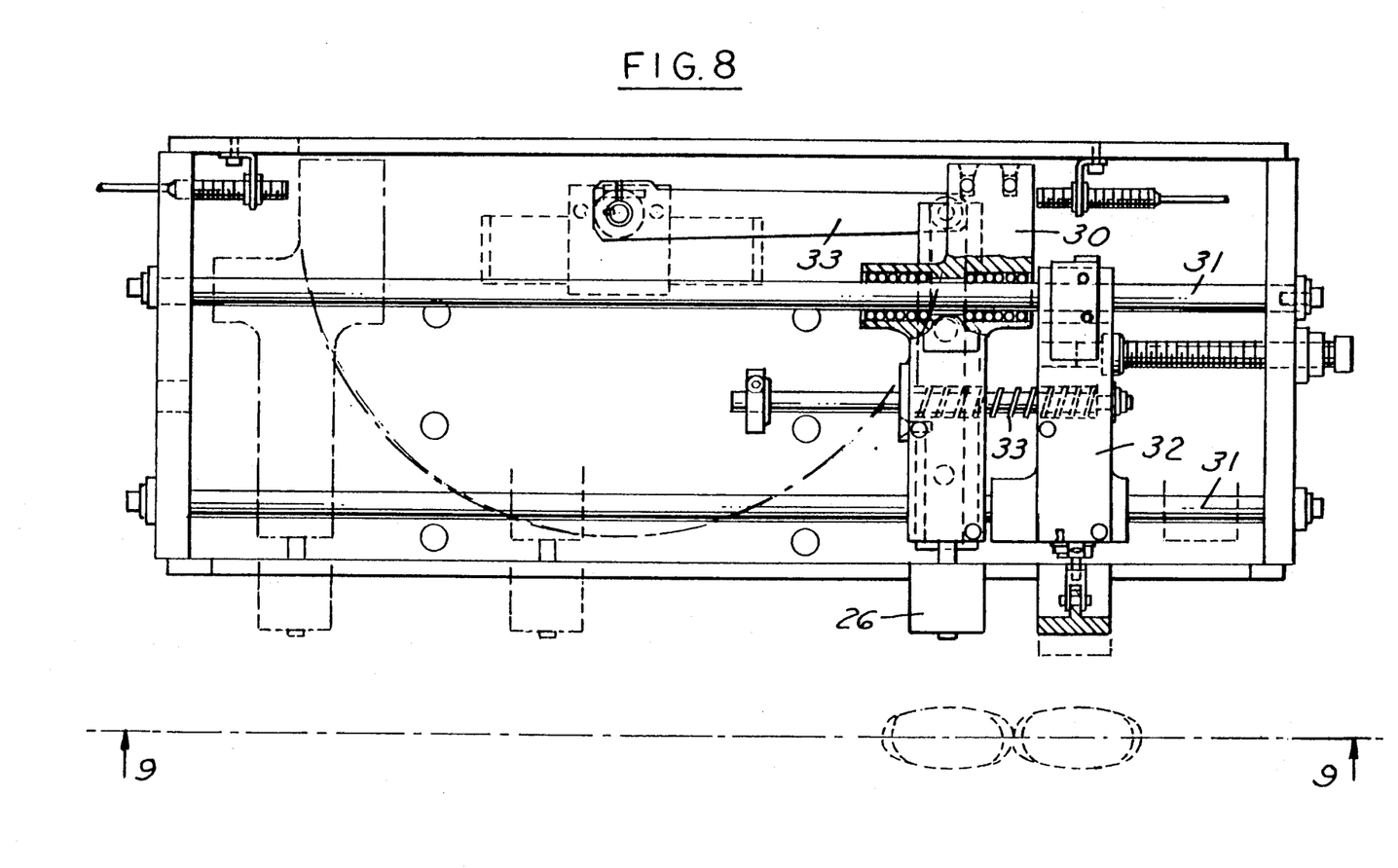
FIG. 8 is a fragmentary plan view of the loading portion of the apparatus.
Figure 9:
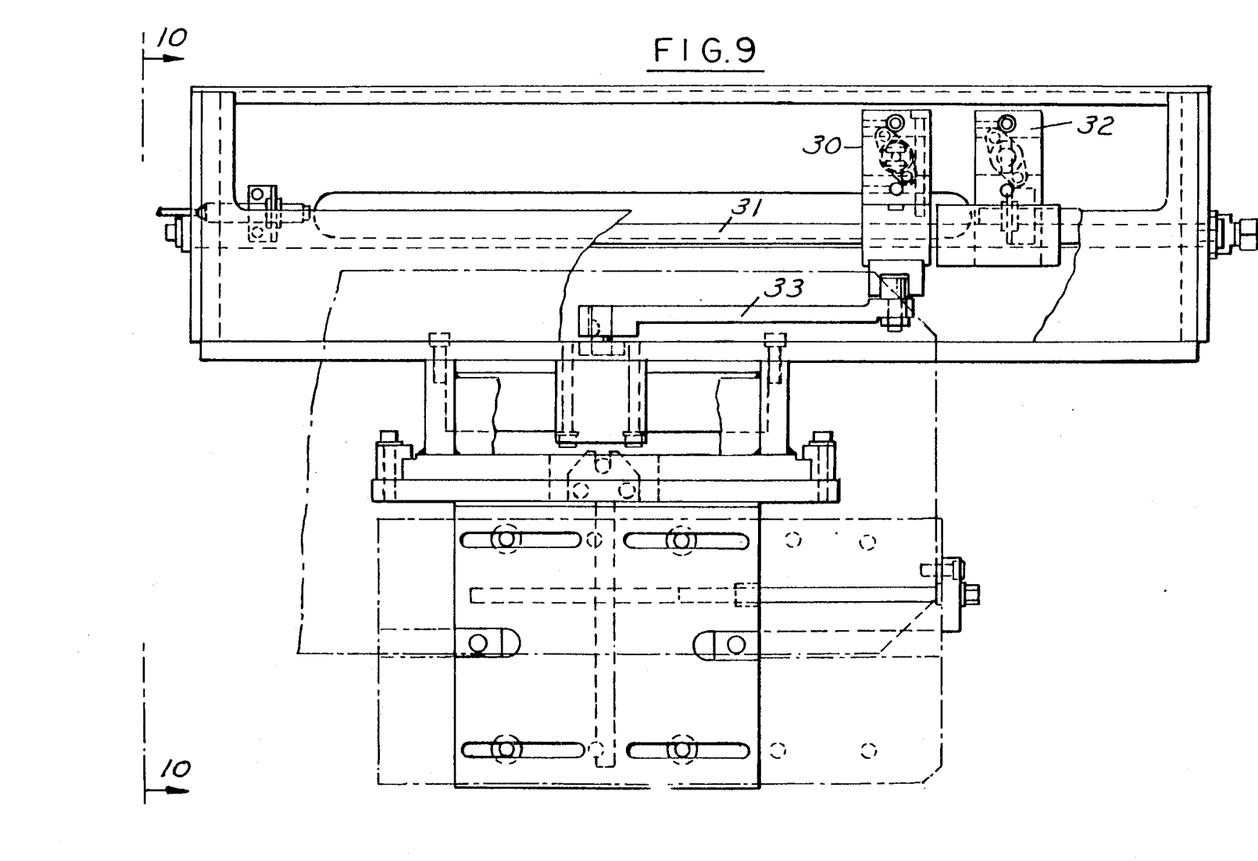
FIG. 9 is a view taken along the line 9—9 in FIG. 8.
Figure 10:
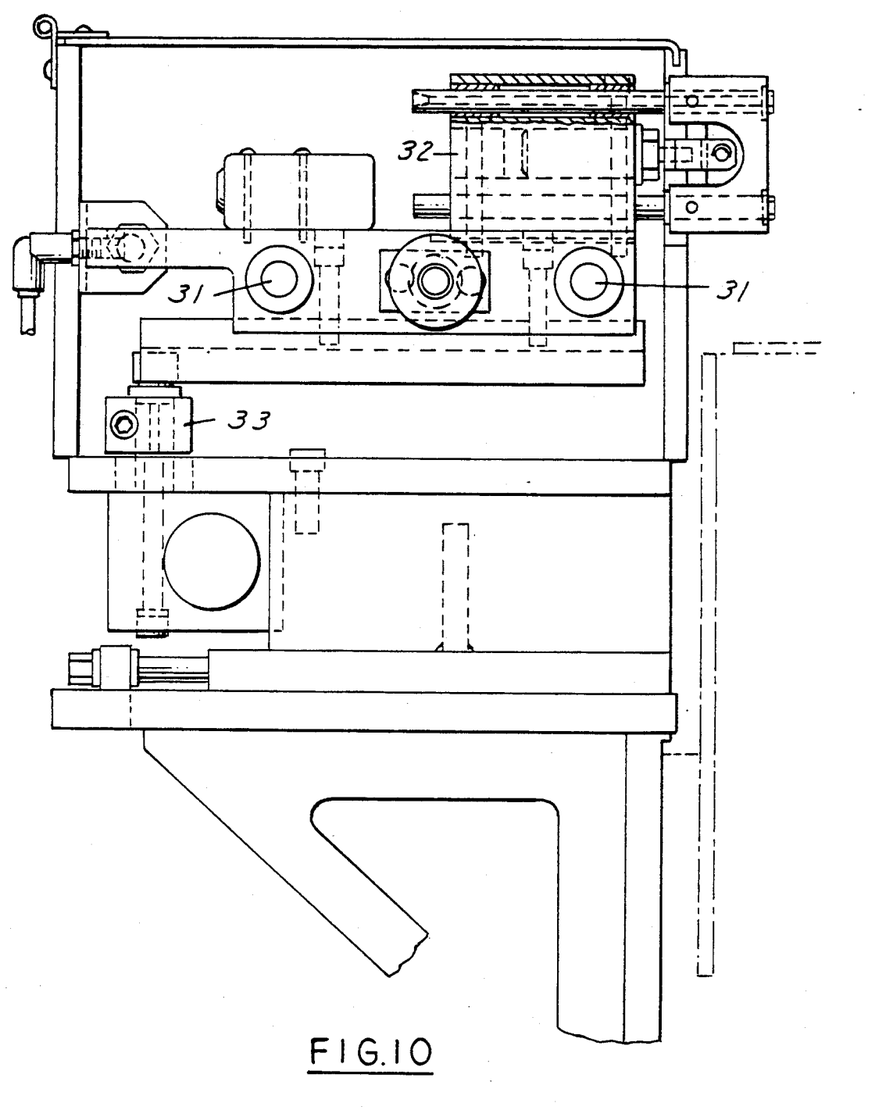
FIG. 10 is a view taken along the line 10—10 in FIG. 9.

Referring to FIG. 5, the loading apparatus includes a bottle stop 25 which is extended and retracted by a cylinder to interrupt the movement of the bottle so that it can be engaged by a cup head 26 and a loader nest 27 operated by a cylinder for accurately positioning the container or bottle longitudinally of the conveyor 10 and mechanisms for providing a sequence as follows:

1. Loader nest "extends"
2. Vacuum cup head "extends"
3. Bottle stop "retracts"
4. Loader nest retracts"
5. Loader vacuum cup head "indexes bottle"
6. Vacuum cup head "retracts"
7. Bottle stop "extends"
8. Loader vacuum cup head "indexes back"
9. Vacuum conveyor indexes 15" inches The portion of the loader apparatus for indexing the vacuum cup head 26 is shown in FIGS. 8-10 and comprises a head 30 that is slidably mounted on longitudinally extending shafts 31 by bearings. The head 30 supports the vacuum cup head 26. A fixed head 32 is provided and a spring 33 yieldingly urges the head 30 toward the left as viewed in FIG. 8.

Head 30 is reciprocated longitudinally by a crank 33 that is oscillated to move each article that is engaged to a predetermined spacing from the stop 25 thereby positioning the article on the conveyor in a predetermined position.

The operation of the crank 33 is performed in timed relationship to the operation of the conveyor and the mechanisms which perform functions on the article, all of the drive being from a common drive.

Although the method and apparatus has been described for use with apparatus for trimming and inspecting hollow plastic articles, it can also be used for positioning hollow plastic articles and transporting them in accurate positions.

It can thus be seen that there has been provided a method and apparatus for positioning and indexing molded hollow plastic articles for trimming molded hollow plastic articles having flash and a finish for a closure; wherein the articles are supported and moved in succession by vacuum conveyor which holds the articles in upright position and moves them past successive station for deflashing, facing, inspection, rejection and unloading. The conveyor is a chain slat conveyor having longitudinally spaced vertical holes that communicate with a vacuum chamber over which the conveyor is trained. The conveyor is driven intermittently and moves the articles in succession past each of the stations. At the load station, the articles are oriented so that they are in proper alignment and relationship to the openings in the conveyor.

I claim:

1. A method of positioning and indexing hollow plastic articles for trimming and other functions at successive equally spaced stations, said method comprising the steps of intermittently moving a vacuum conveyor past said successive stations for performing operations on said containers in succession, delivering containers in succession onto said conveyor, stopping a container on the vacuum conveyor by a stop, engaging said container while it is stopped by a nest and a vacuum head to orient the container and engage said container by said vacuum head, moving said engaged container by moving said vacuum head to a predetermined accurate spacing from said stopped position corresponding to the spacing of said stations, releasing said container from said nest and vacuum head, and advancing said conveyor intermittently, successively stopping each successive container, engaging each container and moving each engaged container, and spacing said successive container in a similar fashion.

2. The method set forth in claim 1 wherein said step of moving said engaged container is by moving said vacuum head by reciprocating the vacuum head.

3. An apparatus for positioning and indexing hollow plastic articles for trimming and other functions at successive equally spaced stations, said apparatus comprising an intermittently driven vacuum conveyor movable past said successive stations for performing operations in succession, said vacuum conveyor being adapted to receive plastic containers, a stop associated with said vacuum conveyor for stopping containers on said vacuum conveyor, a nest adjacent said stop, a vacuum head adjacent said stop, means for moving said nest and said vacuum head toward and away from a container at said stop to orient a container and cause said vacuum head to engage a container, means for moving said vacuum head beyond said stop to a position at a spacing corresponding to the spacing of said stations, and means for releasing said vacuum head to release said container in accurate spaced position on said vacuum head.

4. The apparatus set forth in claim 3 wherein said means for moving said vacuum head comprises a slide on which said vacuum head is mounted.

5. The apparatus set forth in claim 4 wherein said means for moving said vacuum head comprises a crank engaging said vacuum head and moving said vacuum head.

* * * * *